(No Model.)
J. SHANK.
CULTIVATOR.
No. 417,746. Patented Dec. 24, 1889.
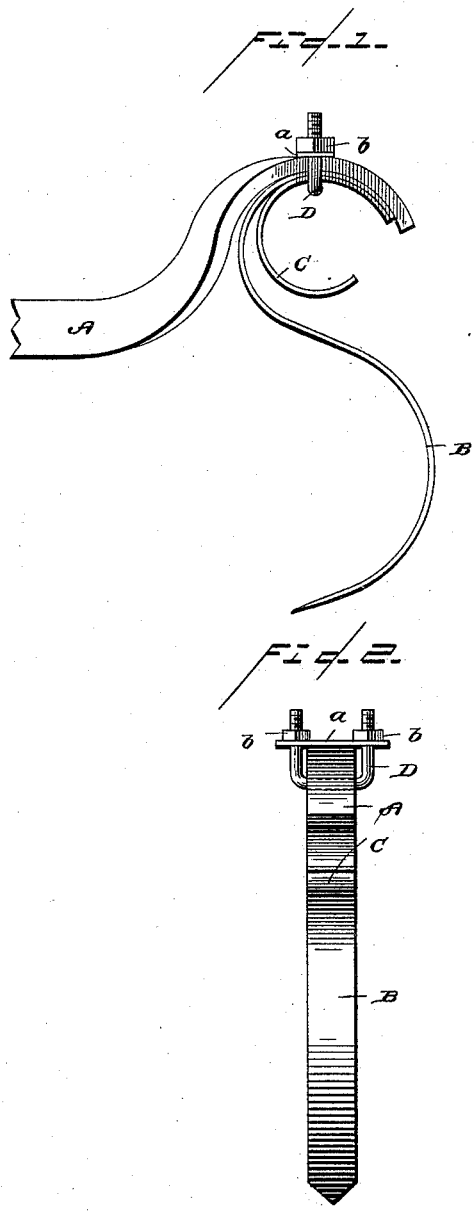
Witnesses
Inventor
James Shank.
By his Attorney James J Sheehy

UNITED STATES PATENT OFFICE.

JAMES SHANK, OF CLAYTON, ILLINOIS.

CULTIVATOR.

SPECIFICATION forming part of Letters Patent No. 417,746, dated December 24, 1889.

Application filed June 8, 1888. Serial No. 276,459. (No model.)

*To all whom it may concern:*

Be it known that I, JAMES SHANK, a citizen of the United States, residing at Clayton, in the county of Adams and State of Illinois, have invented certain new and useful Improvements in Cultivators; and I do declare the following to be a full, clear, and exact description of the invention, such as will enable others skilled in the art to which it appertains to make and use the same.

This invention has relation to harrows, cultivators, and other machines in which spring-teeth are employed, and it is more particularly designed as an improvement upon the devices shown in the Letters Patent granted to me April 10, 1888, No. 380,948.

The main object of the invention is to provide an equalizing-spring which may be made to equalize the strain upon the spring-tooth, so as to lessen or increase the rigidity of the latter.

The invention will be fully understood from the following description, when taken in connection with the annexed drawings, in which—

Figure 1 is a side view of a portion of a cultivator-beam, showing a spring-tooth with my improvements attached; and Fig. 2 is a rear view of the same.

Referring by letter to the said drawings, A indicates a portion of a cultivator or harrow beam, which has its rear end curved, as shown, to receive the upwardly-curved end of a spring-tooth.

B indicates a spring-tooth, which I have shown in the present illustration as being of S shape, although I do not wish to confine myself to this particular form of tooth.

C indicates the equalizing-spring, which may be of C form, as shown, so that it may sit snugly within the upwardly-curved portion of the tooth and confine the latter in the upwardly-curved portion of the beam A. It should be here observed that this spring C may be moved with respect to the tooth, and that its function is to press against the upwardly-curved portion of the said tooth with greater or less force, which is accomplished by changing the point of attachment in the yoke D.

D indicates a yoke, which is composed of a rod threaded at opposite ends, and is adapted to embrace the tooth and equalizing-spring, so as to confine them in the curved portion of the beam. The threaded branches of this yoke are connected by means of a plate *a* on the upper side of the beam, and nuts *b* are employed for securing the yoke in position. It will thus be seen that the tooth and equalizing-spring may be secured to the beam at any desired point.

It should here be observed that the spring C is free to move with respect to the tooth, and that its force may be increased on the rear side of the tooth by loosening the yoke and moving the said spring within the curved portion of the tooth, so as to increase or reduce its frictional contact with the spring beyond the yoke or point of attachment, thereby adapting the tooth for service in various kinds of soil.

I am aware that it is old to pivot or hinge a harrow-tooth and to back the same by a tension-spring, whereby pressure on the tooth may be increased or lessened, as desired; but my invention differs from such devices, inasmuch as the tooth is not hinged or pivoted, but firmly secured in a curved seat, the tension being had by the curved spring C, movably secured to the under side of the upper curved portion of the tooth.

I am also aware of the patent granted to W. S. Lawrence September 14, 1880, in which a spring-tooth having a reversibly-curved end is seated in a concave bearing, and a reenforcing strip having the curvature of the inner end of the tooth is employed. This reenforcing strip has a projection, as *e*, on one end, so as to abut against the adjacent end of the tooth, and the said strip lies firmly against the tooth throughout its length.

Having described my invention, what I claim is—

The combination, with a cultivator-beam having its rear end curved upwardly and downwardly, as described, so as to form a concave seat in the under side thereof, of an approximately S-shaped spring-tooth having its upper curved portion secured in the curve of the beam, and the independently-movable equalizing-spring C, arranged on the under side of the said tooth, as distinguishable from being secured to the tooth, and also secured in the curved portion of the said beam against the tooth, the equalizing-spring falling away from the tooth, so as to present a gradually-increasing resistance to said tooth when the latter is encountered by an obstruction, substantially as specified.

In testimony whereof I affix my signature in presence of two witnesses.

JAMES SHANK.

Witnesses:
C. H. MOFFETT,
JAS. B. COE.